United States Patent
Chiang et al.

(10) Patent No.: US 7,817,408 B2
(45) Date of Patent: Oct. 19, 2010

(54) NOTEBOOK COMPUTER

(75) Inventors: Shih-Wen Chiang, Taipei (TW); Pao-Tung Weng, Taipei (TW)

(73) Assignee: Northern Lights Semiconductor Corp., St. Paul, MN (US)

( * ) Notice: Subject to any disclaimer, the term of this patent is extended or adjusted under 35 U.S.C. 154(b) by 0 days.

(21) Appl. No.: 12/409,050

(22) Filed: Mar. 23, 2009

(65) Prior Publication Data

US 2009/0296336 A1    Dec. 3, 2009

(30) Foreign Application Priority Data

May 27, 2008   (TW)   ............... 97119566 A

(51) Int. Cl.
*H05K 5/00* (2006.01)
*H05K 7/00* (2006.01)

(52) U.S. Cl. .................. 361/679.07; 361/679.27; 361/679.06

(58) Field of Classification Search ............ 361/679.27, 361/679.06, 679.07
See application file for complete search history.

(56) References Cited

U.S. PATENT DOCUMENTS 6,504,707 B2 * 1/2003 Agata et al. ............ 361/679.05
7,054,145 B2   5/2006 Tanaka et al.
2005/0237701 A1   10/2005 Yu
2008/0278897 A1 * 11/2008 Kim et al. .................. 361/681

FOREIGN PATENT DOCUMENTS

| CN | 2610385 | 4/2004 |
| CN | 1619459 | 5/2005 |
| TW | M280494 | 11/2005 |

OTHER PUBLICATIONS

English language translation of abstract of CN 2610385, Apr. 7, 2004.
English language translation of TW M280494, Nov. 11, 2005.
English language translation of abstract CN 1619459 (published May 25, 2005).

* cited by examiner

*Primary Examiner*—Jayprakash N Gandhi
*Assistant Examiner*—Anthony M Haughton
(74) *Attorney, Agent, or Firm*—Thomas, Kayden, Horstemeyer & Risley, LLP

(57) ABSTRACT

A notebook computer includes a host, a supporting frame and a displayer. The supporting frame is pivotally connected with the host and has a straight sliding slot and a curved sliding slot. The displayer has two sliding members, which are pivotally connected with the supporting frame and slidably connected with the straight sliding slot and the curved sliding slot respectively. The displayer is operable to rotate relative to the supporting frame by using either one of the two sliding members as a pivot.

9 Claims, 6 Drawing Sheets

NOTEBOOK COMPUTER

RELATED APPLICATIONS

This application claims priority to Taiwan Application Serial Number 97119566, filed May 27, 2008, which are herein incorporated by reference.

BACKGROUND

1. Field of Invention

The present invention relates to a computer device, and more particularly, to a notebook computer.

2. Description of Related Art

Notebook computers are very popular in the market in recent years and have become a mainstream in the computer market. The notebook computer equipped with a wide screen is another mainstream in the computer market. The wide screen is conventionally connected with a host by a landscape way, i.e. the wide screen has a relatively long edge pivotally connected with the host. The wide screen in landscape mode is beneficial for displaying movies, but has few benefits for browsing web pages or editing articles or programs, and increases a using rate of a computer mouse. For the forgoing reasons, there is a need for improving a notebook computer to satisfy both demands of the screen in landscape mode and in portrait mode.

SUMMARY

It is therefore an objective of the present invention to provide a notebook computer equipped with a displayer switchable between a landscape mode and portrait mode.

In accordance with the foregoing and other objectives of the present invention, a notebook computer includes a host, a supporting frame and a displayer. The supporting frame is pivotally connected with the host and has a straight sliding slot and a curved sliding slot. The displayer has two sliding members, which are pivotally connected with the supporting frame and slidably connected with the straight sliding slot and the curved sliding slot respectively. The displayer is operable to rotate relative to the supporting frame by using either one of the two sliding members as a pivot.

Thus, the present invention provides a notebook computer, which is equipped with a displayer readily switchable between the portrait mode and the landscape mode for performing preferable functionalities.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
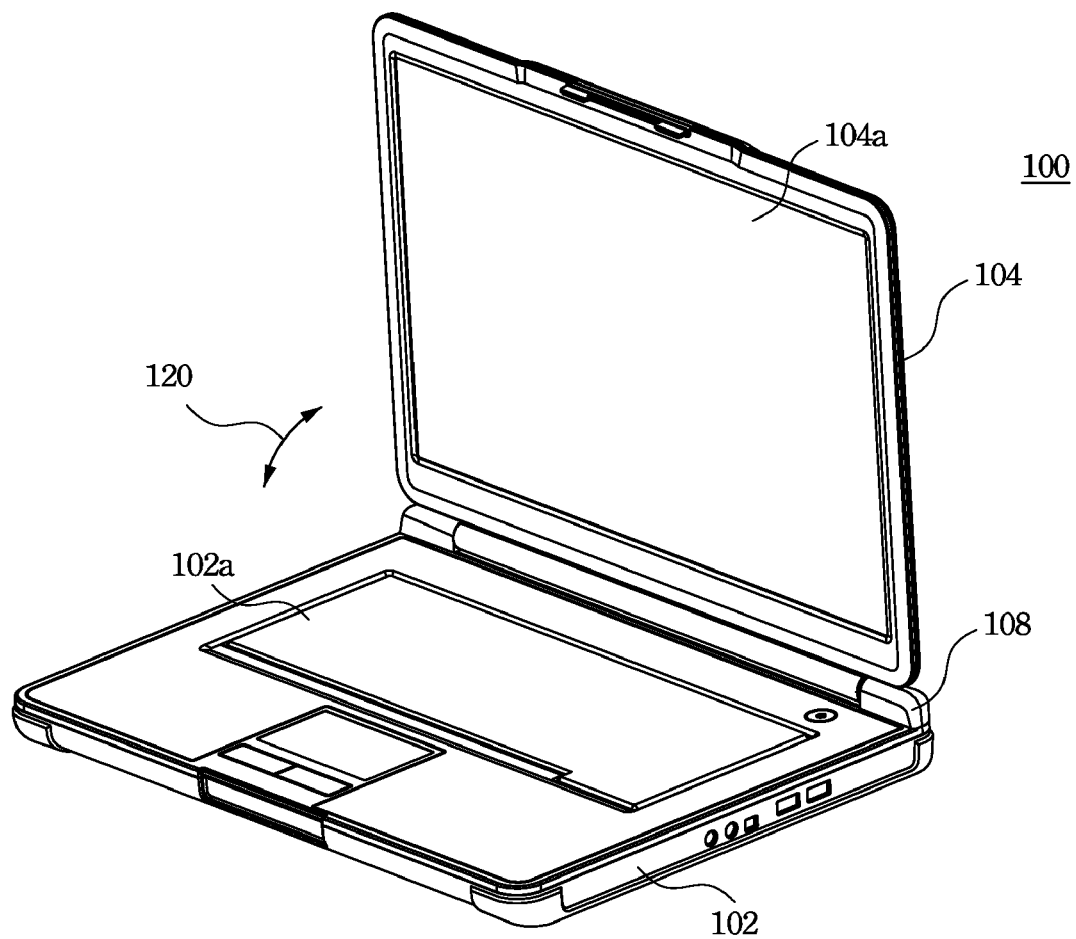
FIG. 1 illustrates a notebook computer according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
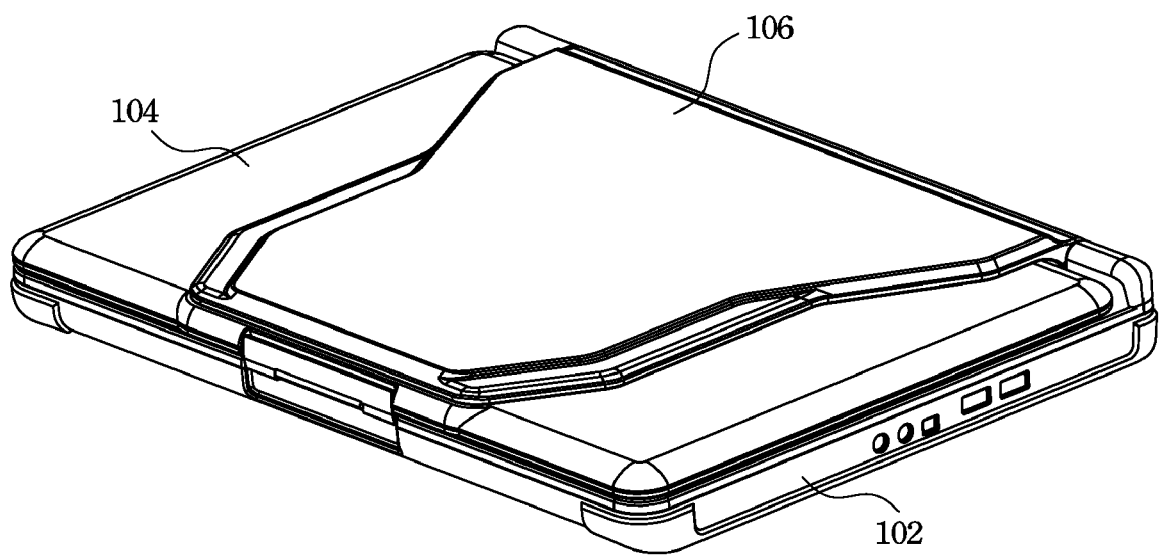
FIG. 2 illustrates the notebook computer in FIG. 1 with a displayer laid against a host.

FIG. 1 illustrates a notebook computer according to one preferred embodiment of this invention. FIG. 2 illustrates the notebook computer in FIG. 1 with a displayer laid against a host. The notebook computer 100 includes a host 102, a displayer 104 and a supporting frame 106. The supporting frame 106 is pivotally connected with an edge of the host 102 while the displayer 104 is pivotally connected with the supporting frame 106. Therefore, the displayer 104 can be swiveled relative to the host 102 along a direction 120, by the supporting frame 106, to selectively lay against the host 102 or form an included angle between the host 102 and the displayer 104. The host 102 has a keyboard 102a, and the displayer 104 has a display screen 104a. When the displayer 104 is laid against the host 102, the display screen 104a is laid against the keyboard 102a.

Figure 3:
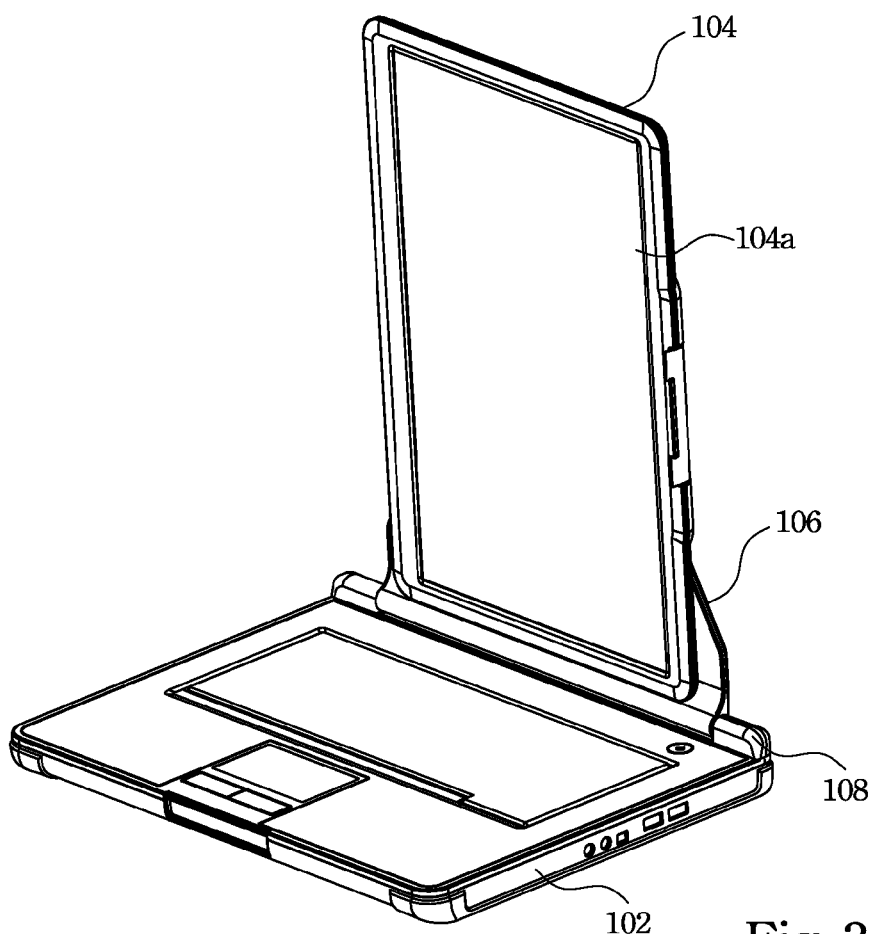
FIG. 3 illustrates the notebook computer in FIG. 1 with the displayer rotated relative to the host by 90 degrees.
Figure 4:
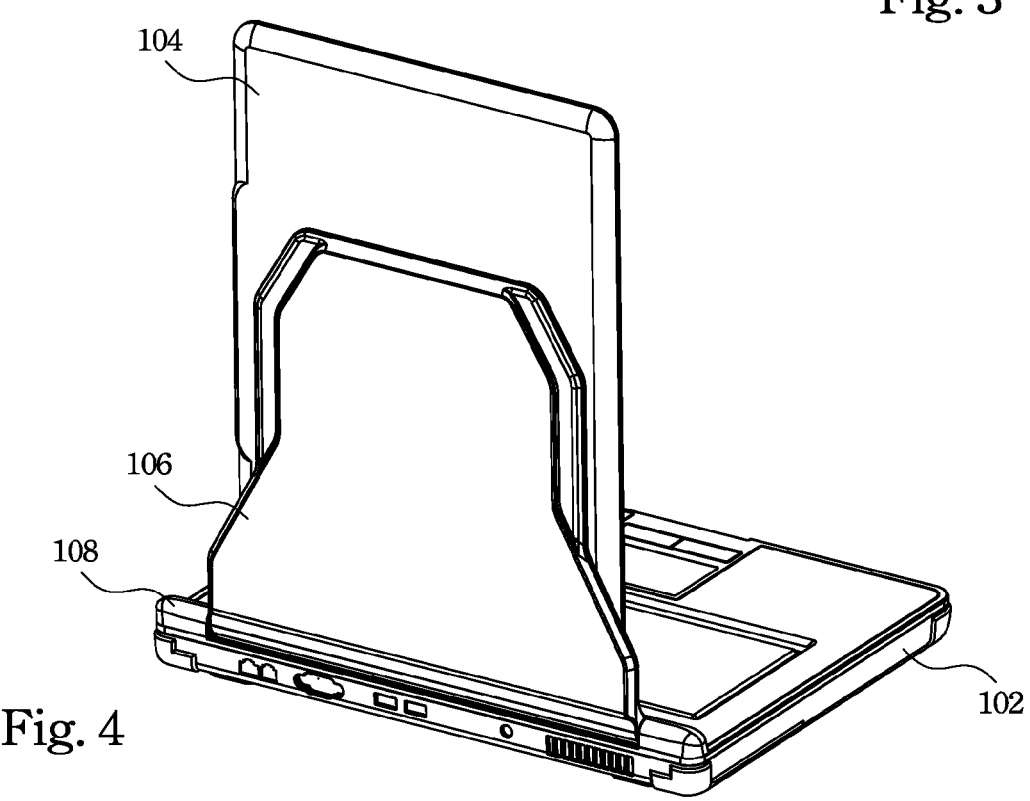
FIG. 4 illustrates another view of the notebook computer in FIG. 3.

FIG. 3 illustrates the notebook computer in FIG. 1 with the displayer rotated relative to the host by 90 degrees. FIG. 4 illustrates another view of the notebook computer in FIG. 3. The notebook computer 100 is equipped with a rotatable displayer 104. The displayer 104 can be rotated relative to the supporting frame 106 to be selectively in landscape mode (see the displayer 104 with a relatively long edge adjacent to the host 102 in FIG. 1) or in portrait mode (see the displayer 104 with a relatively short edge adjacent to the host 102 in FIG. 3). The displayer 104 in landscape mode and in portrait mode is preferable for performing different functionalities. For example, the displayer 104 in landscape mode is preferable for displaying movies while the displayer 104 in portrait mode is preferable for browsing web pages or editing articles or programs. How the displayer 104 being switchable between the landscape mode and the portrait mode is described.

Figure 5:
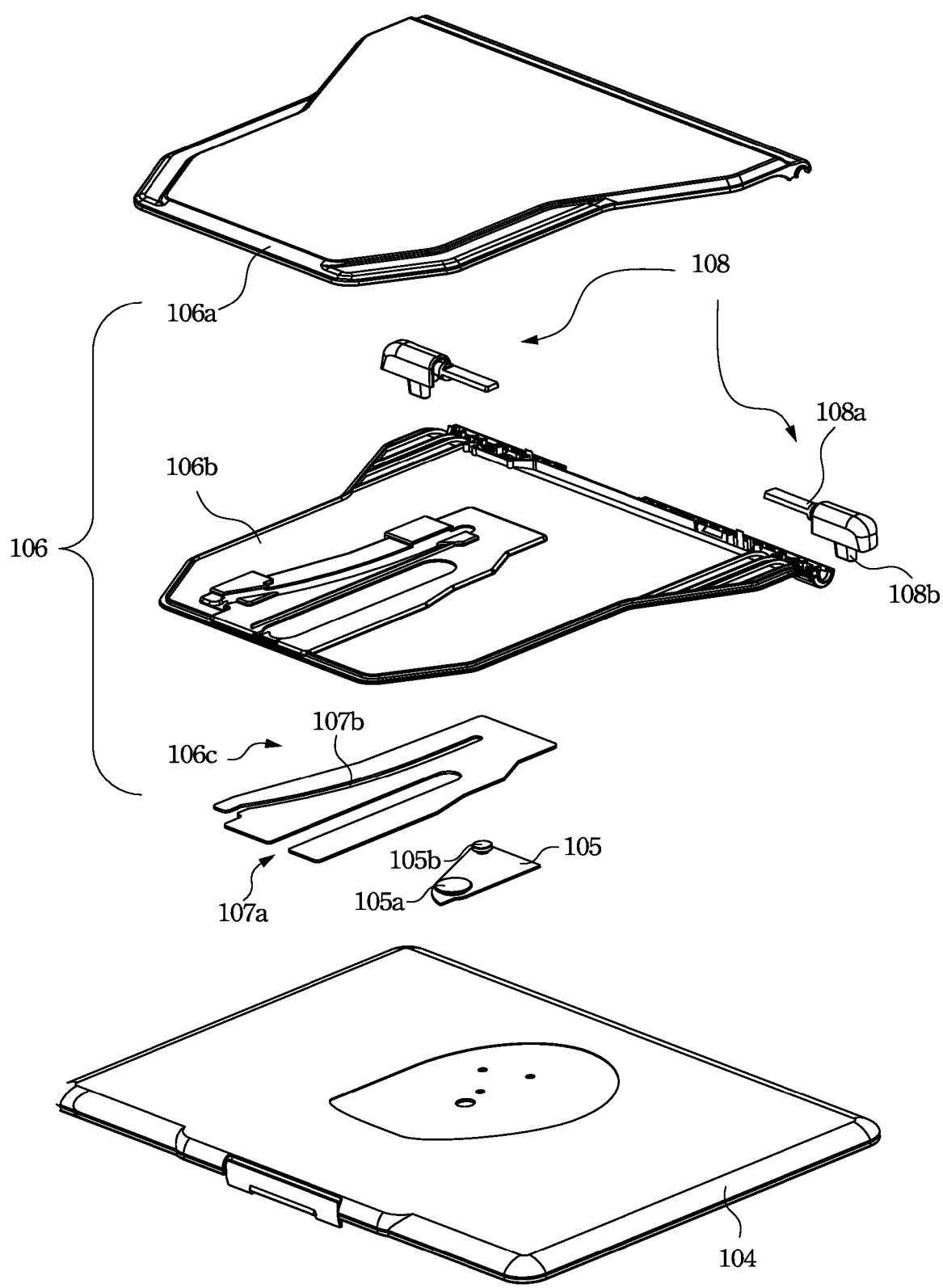
FIG. 5 illustrates an exploded view of the displayer and the supporting frame.

FIG. 5 illustrates an exploded view of the displayer and the supporting frame. The supporting frame 106 includes an upper housing wall 106a, a lower housing wall 106b and a connection bracket 106c. The supporting frame 106 is pivotally connected with the host 102 by two hinges 108 such that the supporting frame 106 can be swiveled relative to the host 102. Each hinge 108 has a connection end 108a secured between the upper housing wall 106a and the lower housing wall 106b. Each hinge 108 has another connection end 108b secured to the host 102. The connection bracket 106c has a straight sliding slot 107a and a curved sliding slot 107b. The connection bracket 106c is attached to a bottom side of the lower housing wall 106b when all parts of the supporting frame 106 are assembled. A connection member 105 is assembled to the connection bracket 106c by respectively engaging two sliding members (105a; 105b) into two sliding slots (107a; 107b) from their lateral openings. The connection member 105 is attached to a top side of the displayer 104. All those parts (except the upper housing wall 106a) in FIG. 5 are put together to form the assembled status as illustrated in FIG. 6.

Figure 6:
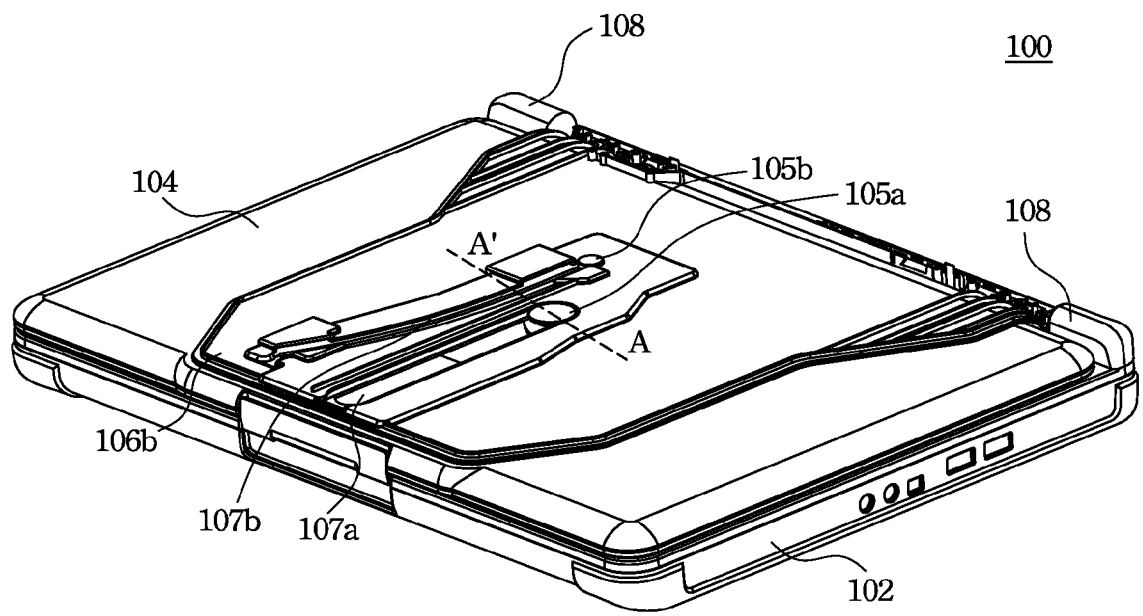
FIG. 6 illustrates the notebook computer in FIG. 2 with an upper housing wall removed.
Figure 6A:
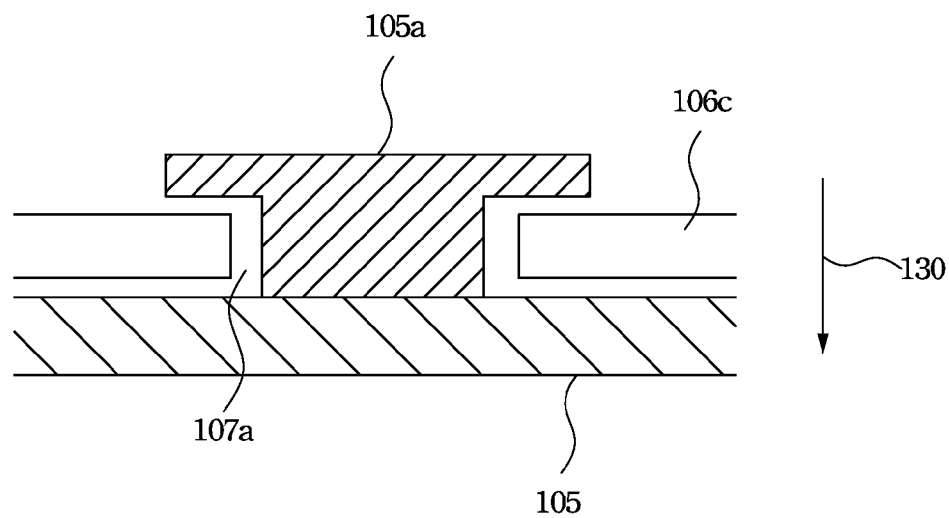
FIG. 6A illustrates a cross-sectional view of a sliding member engaging a sliding slot taken along line A-A' in FIG. 6.

FIG. 6A illustrates a cross-sectional view of a sliding member engaging a sliding slot taken along a cross-sectional line A-A' in FIG. 6. The sliding member 105a (of a disk shape) has a substantially T-shaped cross section to engage the sliding slot 107a of the connection bracket 106c such that the sliding member 105a cannot be separated from the connection bracket 106c along a direction 130. The sliding member 105b (of a disk shape) is connected with the sliding slot 107b by the same way.

Figure 8:
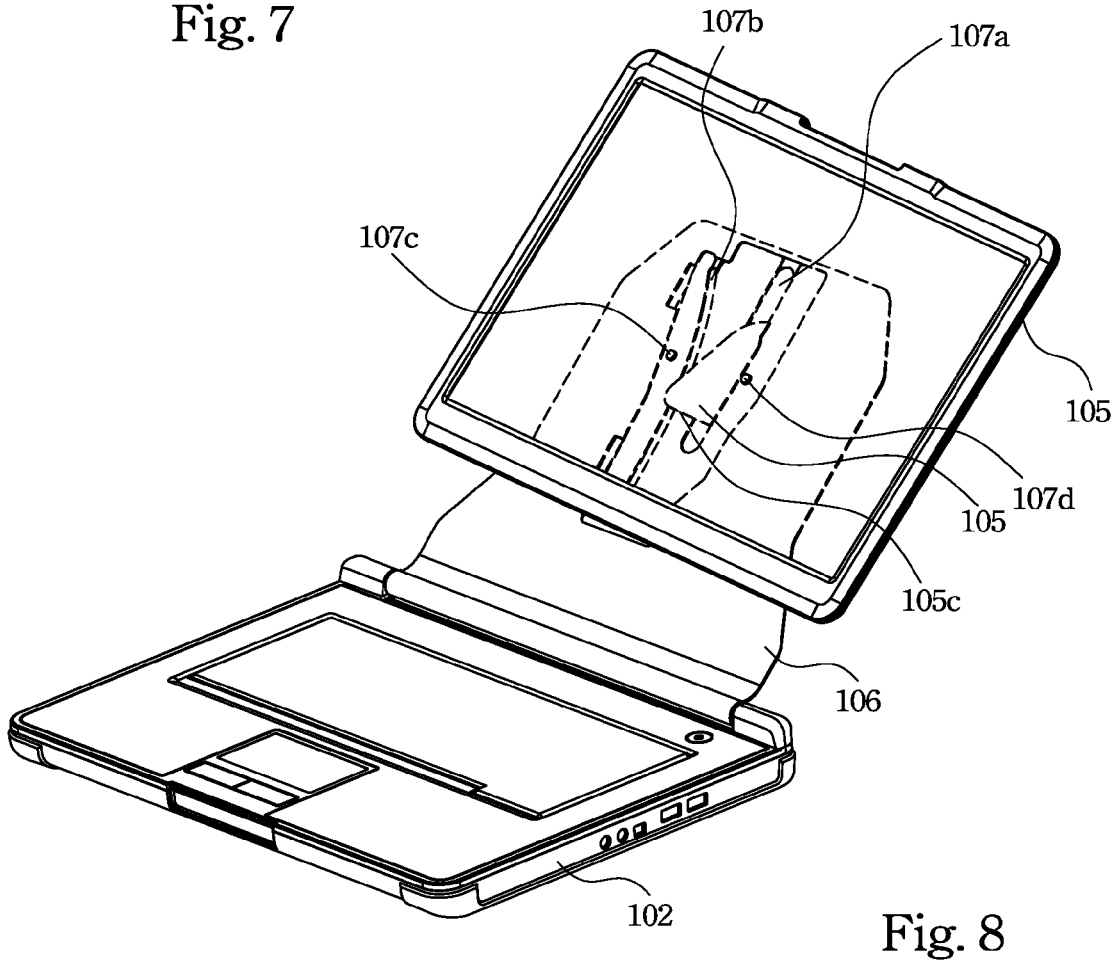
Figure 9:
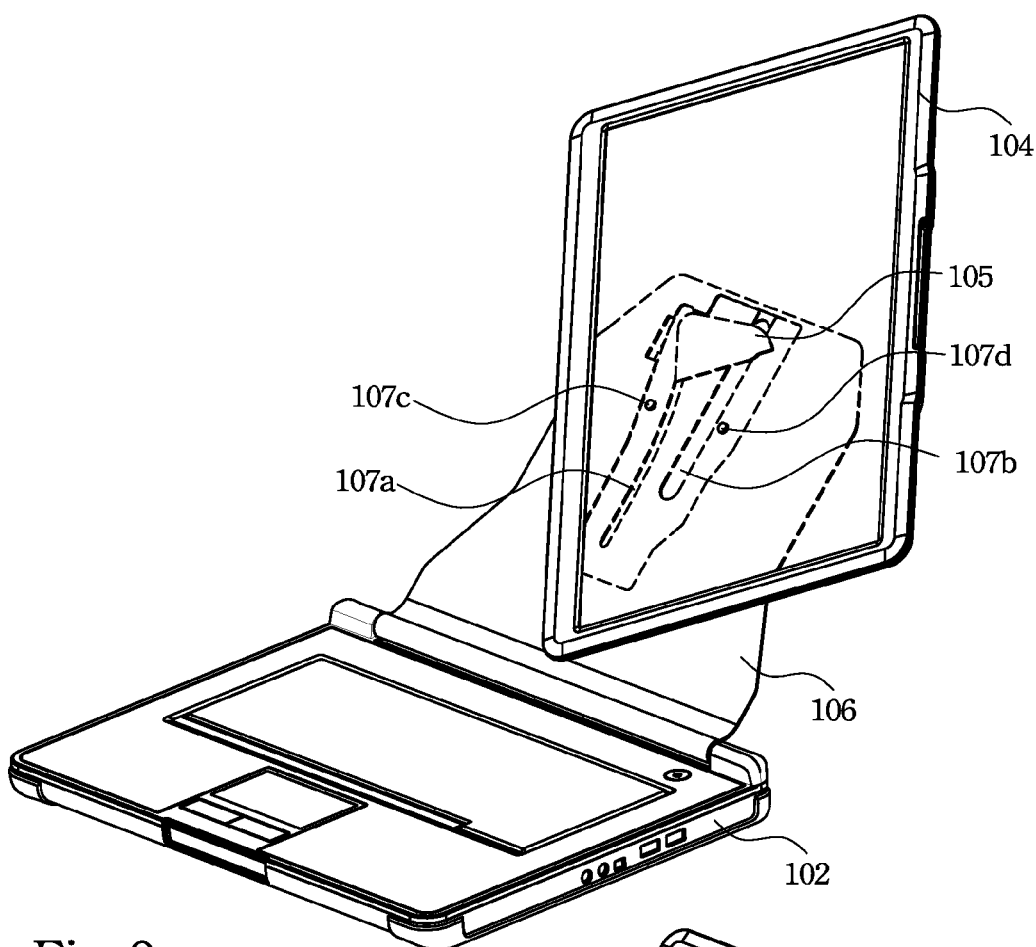
Figure 10:
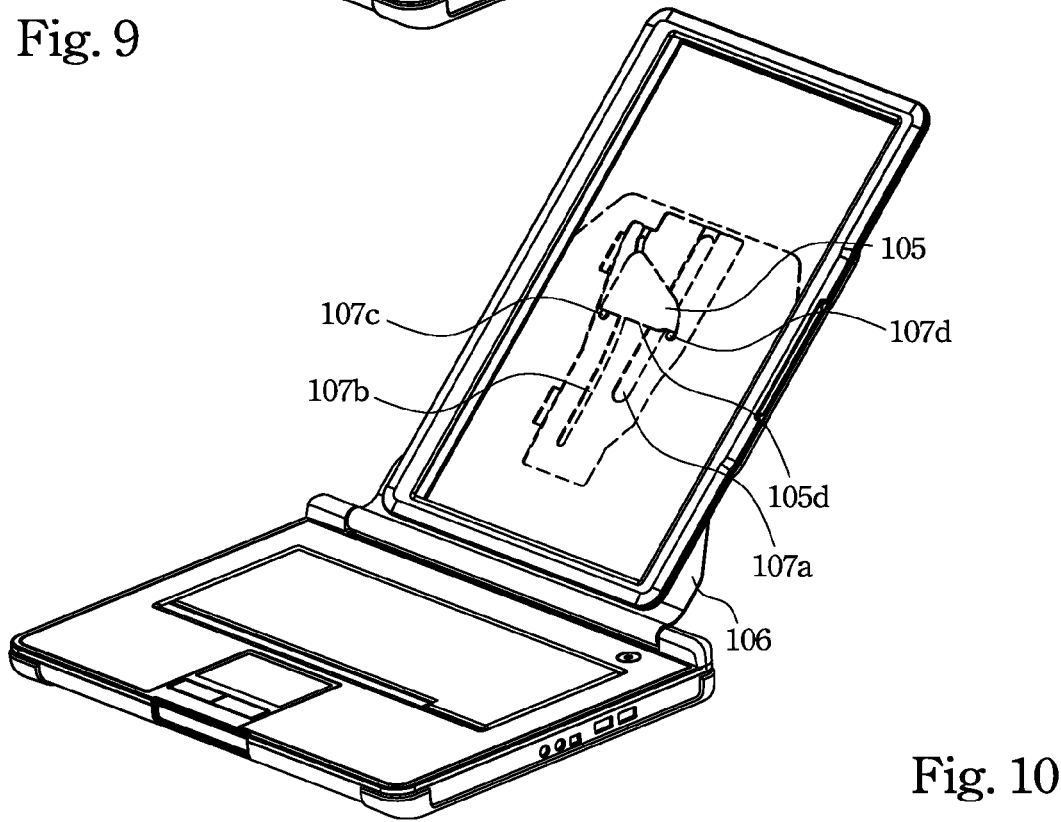

FIGS. 7~10 illustrate a series of views to show how the displayer rotates from a landscape mode (see FIG. 7) to a portrait mode (see FIG. 10). The parts illustrated in dashed-lines are parts behind the display screen 104a.

Figure 7:
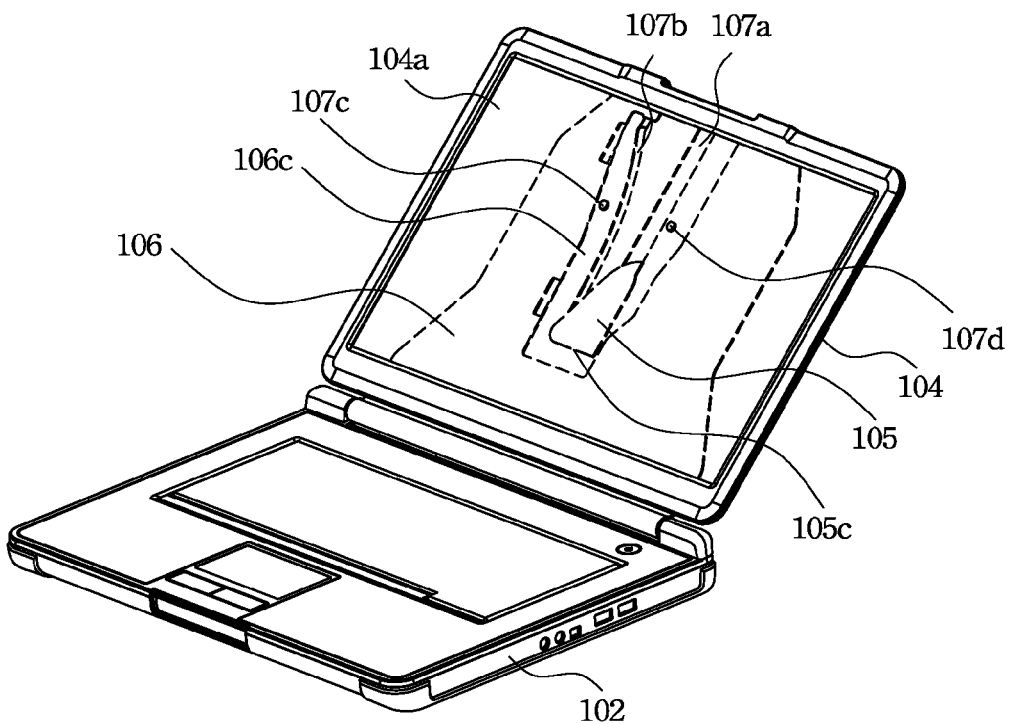
FIGS. 7~10 illustrate a series of views to show how the displayer rotate from a landscape mode to a portrait mode.

Referring to FIG. 7, the displayer 104 is in landscape mode (the displayer 104 with a relatively long edge adjacent to the host 102). In this case, the connection member 105 is located at the bottom ends of the two sliding slots (107a; 107b) while the displayer 104 has the relatively long edge supported by the supporting frame 106.

Referring to FIG. 8, the connection member 105 is being slid upwards along with the displayer 104 and led through an intervening gap between two suspending ribs (107c; 107d). In order to lead the connection member 105 (of a substantially triangle) through the intervening gap between two suspending ribs (107c; 107d), the connection member 105 needs to have a shortest edge shorter than an interval between two suspending ribs (107c; 107d).

Referring to FIG. 9, the connection member 105 is being rotated relative to the supporting frame 106. In this case (referring also to FIG. 6), the connection member 105 has the two sliding members (105a; 105b) slid and rotated relative to the two suspending ribs (107c; 107d) as if the connection member 105 is pivotally connected with the supporting frame 106. The sliding member 105a is located on a central area of the displayer 104.

Referring to FIG. 10, the connection member 105 has a relatively long edge supported by two suspending ribs (107c; 107d) while the displayer 104 has the relatively short edge supported by the supporting frame 106, i.e., the displayer 104 is in portrait mode. In order to have the connection member 105 (of a substantially triangle) supported by two suspending ribs (107c; 107d), the connection member 105 needs to have a relatively long edge larger than an interval between two suspending ribs (107c; 107d).

In case the displayer 104 is desired to rotate from a portrait mode to a landscape mode, the displayer 104 can be operated from FIG. 10 back to FIG. 7.

The terms "substantially" as used herein may be applied to modify any quantitative representation, which could permissibly vary without resulting in a change in the basic function to which it is related.

According to discussed embodiments, the present invention provides a notebook computer, which is equipped with a displayer readily switchable between the portrait mode and the landscape mode for performing preferable functionalities.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A notebook computer, comprising:
   a host;
   a supporting frame being pivotally connected with the host and having a straight sliding slot and a curved sliding slot; and
   a displayer having two sliding members, which are pivotally connected with the supporting frame and wherein one of the two sliding members is slidably connected with the straight sliding slot and the other of the two sliding members is slidably connected with the curved sliding slot respectively, the displayer being operable to rotate relative to the supporting frame by using either one of the two sliding members as a pivot.

2. The notebook computer of claim 1, wherein the supporting frame is pivotally connected with an edge of the host by a hinge and the straight sliding slot is substantially perpendicular to the edge of the host.

3. The notebook computer of claim 2, wherein the displayer is operable to swivel relative to the host by the hinge to selectively lay against the host or form an included angle between the host and the displayer.

4. The notebook computer of claim 1, wherein the two sliding members both comprise a substantially T-shaped cross section.

5. The notebook computer of claim 1, wherein the displayer comprises a connection member, and the two sliding members are disposed on the connection member.

6. The notebook computer of claim 5, wherein the supporting frame has two suspending ribs, the straight sliding slot and the curved sliding slot are disposed between the two suspending ribs.

7. The notebook computer of claim 6, wherein the connection member comprises a relatively long edge larger than an interval between the two suspending ribs such that the two suspending ribs are able to suspend the connection member.

8. The notebook computer of claim 7, wherein the connection member comprises a shortest edge smaller than an interval between the two suspending ribs such that the connection member is able to be led through an intervening gap between the two suspending ribs.

9. The notebook computer of claim 1, wherein at least one of the sliding members is located on a central area of the displayer.

\* \* \* \* \*

UNITED STATES PATENT AND TRADEMARK OFFICE
CERTIFICATE OF CORRECTION

PATENT NO.       : 7,817,408 B2  
APPLICATION NO.  : 12/409050  
DATED            : October 19, 2010  
INVENTOR(S)      : Shih-Wen Chiang Page 1 of 1

It is certified that error appears in the above-identified patent and that said Letters Patent is hereby corrected as shown below:

On the cover page, in section (73) for the Assignee, please replace "Northern Lights Semiconductor Corp., St. Paul, MN (US)" with "ASUSTEK COMPUTER INC., TAIPEI, TAIWAN."

Signed and Sealed this

Twenty-sixth Day of April, 2011

David J. Kappos
*Director of the United States Patent and Trademark Office*